(12) United States Patent
Sinha

(10) Patent No.: US 8,339,949 B2
(45) Date of Patent: Dec. 25, 2012

(54) PRIORITY-AWARE HIERARCHICAL COMMUNICATION TRAFFIC SCHEDULING

(75) Inventor: Santanu Sinha, Cupertino, CA (US)

(73) Assignee: Cortina Systems Inc., Sunnyvale, CA (US)

( * ) Notice: Subject to any disclaimer, the term of this patent is extended or adjusted under 35 U.S.C. 154(b) by 221 days.

(21) Appl. No.: 11/976,459

(22) Filed: Oct. 24, 2007

(65) Prior Publication Data

US 2009/0109846 A1    Apr. 30, 2009

(51) Int. Cl.
*H04L 12/28* (2006.01)
(52) U.S. Cl. ............... 370/230.1; 370/395.4; 370/230
(58) Field of Classification Search ............ 370/395.4, 370/412, 230.1
See application file for complete search history.

(56) References Cited

U.S. PATENT DOCUMENTS

| | | | |
|---|---|---|---|
| 2003/0081544 A1* | 5/2003 | Goetzinger et al. | 370/229 |
| 2005/0111462 A1* | 5/2005 | Walton et al. | 370/395.4 |
| 2006/0176883 A1* | 8/2006 | Shoham et al. | 370/395.42 |
| 2006/0187949 A1 | 8/2006 | Seshan et al. | |
| 2007/0070895 A1* | 3/2007 | Narvaez | 370/230 |

OTHER PUBLICATIONS

International Search Report based on International PCT Application No. PCT/US2008/012028.
Interantional Written Opinion based on International PCT Application No. PCT/US2008/012028.
M. Shreedhar, G. Varghese, "Efficient Fair Queuing Using Deficit Round Robin", SIGCOMM '95 Cambridge, MA, U.S.A., pp. 231 to 242.
L. Lenzini, E. Mingozzi, G. Stea, "Bandwidth and Latency Analysis of Modified Deficit Round Robin Scheduling Algorithms", ValueTools '06, Oct. 11-13, 2006, Pisa, Italy, 10 pages.

* cited by examiner

*Primary Examiner* — Dang T Ton
*Assistant Examiner* — Pamit Kaur

(57) ABSTRACT

Priority-aware hierarchical communication traffic scheduling methods and apparatus are disclosed. Communication traffic is scheduled by schedulers. Each scheduler supports a multiple priority scheduling function to schedule communication traffic having any of multiple priorities. The communication traffic scheduled by the schedulers is further scheduled based on the priorities of the communication traffic scheduled by each of the schedulers. Traffic shaping may also be integrated into a hierarchical scheduler. The priority-aware further scheduling and the optional shaping may be implemented, for example, using multiple Active lists, one per traffic priority, and a Pending list to which a scheduler can be added if it has communication traffic to schedule but is not allowed to schedule that traffic due to the shaping.

11 Claims, 2 Drawing Sheets

PRIORITY-AWARE HIERARCHICAL COMMUNICATION TRAFFIC SCHEDULING

FIELD OF THE INVENTION

This invention relates generally to communications and, in particular, to priority-aware scheduling of communication traffic.

BACKGROUND

Scheduling is done in multiple stages in a hierarchical scheduler. Leaf-level schedulers in a hierarchical scheduler might include some combination of Strict Priority (SP) and Weighted Round Robin/Deficit Round Robin (WRR/DRR) schedulers. Higher levels of a scheduler might include a combination of optional shapers followed by SP, Time Division Multiplexing (TDM) calendar, or DRR scheduling. None of these algorithms used in a second or higher level of a scheduler hierarchy factors in dynamically changing priority of the traffic scheduled by lower level members.

Traditional DRR scheduling, for example, employs a single Active-state list that is not priority-aware, and also does not provide for shaping. Although Modified DRR or (MDRR) scheduling might use one or more SP queues and a DRR at the lowest priority level, the combination is scheduled in a fixed priority order. The SP queues and the DRR scheduler have fixed priorities relative to each other, and only that fixed priority order is applied in subsequent scheduling among the queues and the DRR scheduler.

SUMMARY OF THE INVENTION

Thus, there remains a need for improved techniques for priority-aware hierarchical scheduling.

According to an aspect of the invention, there is provided an apparatus comprising: a plurality of schedulers that schedule communication traffic, each scheduler supporting a multiple priority scheduling function to schedule communication traffic having any of a plurality of priorities; and a priority-aware scheduler, operatively coupled to the plurality of schedulers, that further schedules communication traffic from the plurality of schedulers based on priorities of communication traffic scheduled by each of the plurality of schedulers.

The priority-aware scheduler may further schedule traffic based on priorities by maintaining a plurality of Active lists respectively associated with the plurality of priorities. Each scheduler of the plurality of schedulers may schedule communication traffic to the Active list associated with the priority of communication traffic it is currently scheduling.

In some embodiments, the priority-aware scheduler services the plurality of Active lists in priority order according to a DRR scheduling algorithm.

The apparatus may also include a shaper, operatively coupled between a scheduler of the plurality of schedulers and the priority-aware scheduler, that controls scheduling of communication traffic to the priority-aware scheduler by the scheduler to which the shaper is operatively coupled.

The shaper may allow the scheduler to which it is operatively coupled to schedule communication traffic to the priority-aware scheduler at up to a maximum rate. The scheduler can be added to a Pending list after the shaper has reached its maximum rate.

In some embodiments, the shaper manages the maximum rate by issuing tokens to the scheduler to which it is operatively coupled. The scheduler schedules communication traffic to an Active list when it has communication traffic to schedule and it has sufficient shaper tokens to schedule the communication traffic, and is added to the Pending list when it has communication traffic to schedule but it does not have sufficient shaper tokens to schedule the communication traffic.

The shaper may be one of a plurality of shapers operatively coupled between respective schedulers of the plurality of schedulers and the priority-aware scheduler, with each shaper controlling scheduling of communication traffic to the priority-aware scheduler by the scheduler to which the shaper is operatively coupled. Each shaper may allow the scheduler to which it is operatively coupled to schedule communication traffic to the priority-aware scheduler at up to a respective maximum rate. A scheduler that is operatively coupled to a shaper can be added to a Pending list after its shaper has reached its maximum rate.

A scheduler that is operatively coupled to a shaper may move from the Pending list to an Active list when it has communication traffic to schedule and it is issued sufficient tokens to schedule the communication traffic by its shaper.

The plurality of shapers may include shapers having different respective maximum rates.

A method is also provided, and includes: scheduling communication traffic in a plurality of schedulers, each scheduler supporting a multiple priority scheduling function to schedule communication traffic having any of a plurality of priorities; and further scheduling the communication traffic scheduled in the plurality of schedulers based on priorities of communication traffic scheduled by each of the plurality of schedulers.

The further scheduling may involve maintaining a plurality of Active lists respectively associated with the plurality of priorities, in which case the scheduling in the plurality of schedulers involves each scheduler scheduling communication traffic to the Active list associated with the priority of communication traffic it is currently scheduling.

In some embodiments, the further scheduling involves servicing the plurality of Active lists in priority order according to a DRR scheduling algorithm.

The method may also include shaping the communication traffic that is scheduled by a scheduler of the plurality of schedulers prior to the further scheduling. Shaping may involve allowing communication traffic to be scheduled by the scheduler at up to a maximum rate, and maintaining a Pending list to which the scheduler is added after the maximum rate is reached.

The allowing may involve managing the maximum rate by issuing tokens to the scheduler, in which case the scheduling by the scheduler may involve scheduling communication traffic to an Active list when it has communication traffic to schedule and it has sufficient shaper tokens to schedule the communication traffic. The scheduler is added to the Pending list when it has communication traffic to schedule but it does not have sufficient shaper tokens to schedule the communication traffic.

In some embodiments, scheduling involves moving a scheduler from the Pending list to an Active list when it has communication traffic to schedule and it is issued sufficient shaper tokens to schedule the communication traffic.

Different respective maximum rates may be used for the shaping for different schedulers.

According to another aspect of the invention, there is provided an apparatus comprising: an interface that enables the apparatus to receive communication traffic from a plurality of schedulers that support a multiple priority scheduling function to schedule communication traffic having any of a plurality of priorities; and a priority-aware scheduler, operatively coupled to the interface, that further schedules communication traffic scheduled by the plurality of schedulers based on priorities of communication traffic scheduled by each of the plurality of schedulers.

The priority-aware scheduler may further schedule communication traffic by maintaining a plurality of Active lists, respectively associated with a plurality of communication traffic priorities, to which the plurality of schedulers can schedule communication traffic.

In some embodiments, the priority-aware scheduler services the plurality of Active lists in priority order according to a DRR scheduling algorithm.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
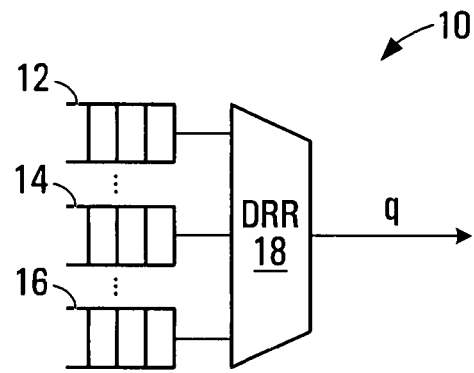
FIG. 1 is a block diagram of a DRR architecture.

FIG. 1 is a block diagram of a DRR architecture. The DRR architecture 10 shown in FIG. 1 includes traffic queues 12, 14, 16, and a DRR scheduler 18. The queues 12, 14, 16 are serviced in a round robin fashion, with the DRR scheduler 18 scheduling up to a quantum of traffic from each queue in each round. Any remainder of the allowed quantum for a queue after the queue is serviced in a round, also referred to as a "deficit", is carried forward to the next round. Further details of DRR scheduling may be found, for example, in: M. Shreedhar and George Varghese, "Efficient Fair Queuing using Deficit Round Robin", Proc. of ACM SIGCOMM '95, August 1995.

Figure 2:
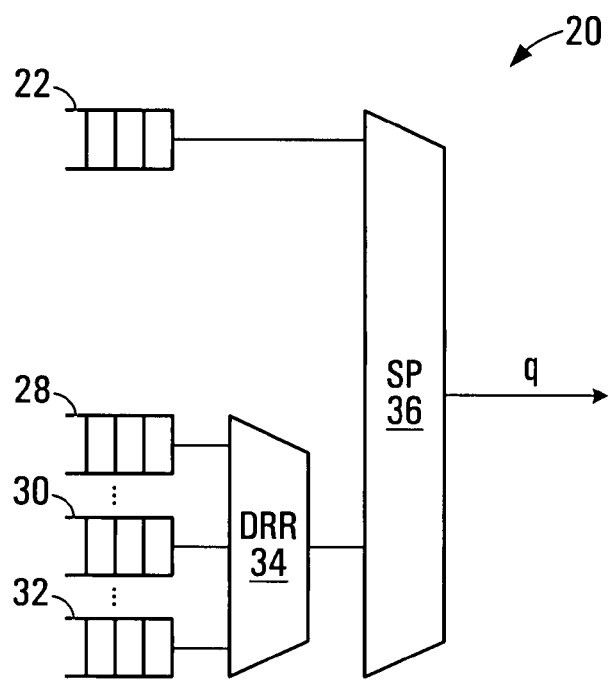
FIG. 2 is a block diagram of an MDRR architecture.

FIG. 2 is a block diagram of an MDRR architecture. The architecture 20 includes a traffic queue 22 from which traffic is directly scheduled by the SP scheduler 36, and three traffic queues 28, 30, 32 from which traffic is initially scheduled by a DRR scheduler 34 and then by the SP scheduler 36. This represents a traditional form of MDRR, which involves SP scheduling among a strict priority queue and the output of a DRR scheduler. When a scheduling request is received by an MDRR scheduler, the SP queue 22 is scheduled. If the SP queue 22 is empty, then the queue 28, 30, 32 picked by the DRR scheduler 34 is scheduled.

An overview of other example implementations of MDRR can be found, for example, in: Luciano Lenzini, Enzo Mingozzi, and Giovanni Stea, "Bandwidth and Latency Analysis of Modified Deficit Round Robin Scheduling Algorithms", Valuetools '06, Pisa, Italy, 11-13 Oct. 2006.

According to an aspect of the present invention, a modified version of a DRR algorithm is used in hierarchical scheduling. Jitter of high priority traffic in a multi-level DRR instance can thereby be reduced.

As described in further detail herein, embodiments of the present invention may provide for priority-aware scheduling of communication traffic among lower-level schedulers, taking into account the priorities of traffic that is currently scheduled by those lower-level schedulers. Where each scheduler supports a multiple priority scheduling function to schedule traffic having any of a number of different priorities, the priority of traffic being scheduled by a lower-level scheduler at any time may dynamically change. A higher-level scheduler implementing an embodiment of the invention schedules traffic from its lower-level schedulers in accordance with such dynamic priorities.

Consider a case where a leaf-level scheduler is an MDRR and the next higher-level scheduler schedules across multiple member MDRRs. In this example, one of the member MDRRs (MDRR1) can schedule priority 1 traffic and at the same time another member MDRR (MDRR3) can schedule priority 3 traffic. However, if a standard scheduler is employed at the next higher level to schedule among multiple of those leaf-level MDRRs, it will not pay attention to the priority levels of the traffic scheduled by individual members.

For instance, an SP scheduler will schedule the member MDRRs in a fixed and static priority order that is configured and not changed, a TDM calendar will not pay attention to priority, and a DRR will schedule from a single Active list based only on deficits and packet lengths, without differentiating the two member MDRRs based on priority. Because such standard higher-level scheduler algorithms are not aware of dynamic changes in priority, any of those may introduce jitter, especially when the number of members at the leaf level is high (>32).

An algorithm according to an aspect of the present invention, however, will pay attention to dynamic changes in priority of the traffic scheduled by its members, and puts them in an appropriate one of a number of lists in some embodiments. As a result, jitter may be reduced at all priority levels. In the above example, MDRR1 might be in Active list #1, with MDRR3 being in Active list #3. Assuming that Active list #1 is associated with higher priority traffic than Active list #3, Active list #1 will be serviced first, followed by Active list #3. Since the decision dynamically depends on the priority level of traffic selected by a leaf member, MDRR1 may move to Active list #2 if the next packet it schedules has priority 2, for example.

Some embodiments also integrate one or more shapers into a hierarchical scheduler.

Figure 3:
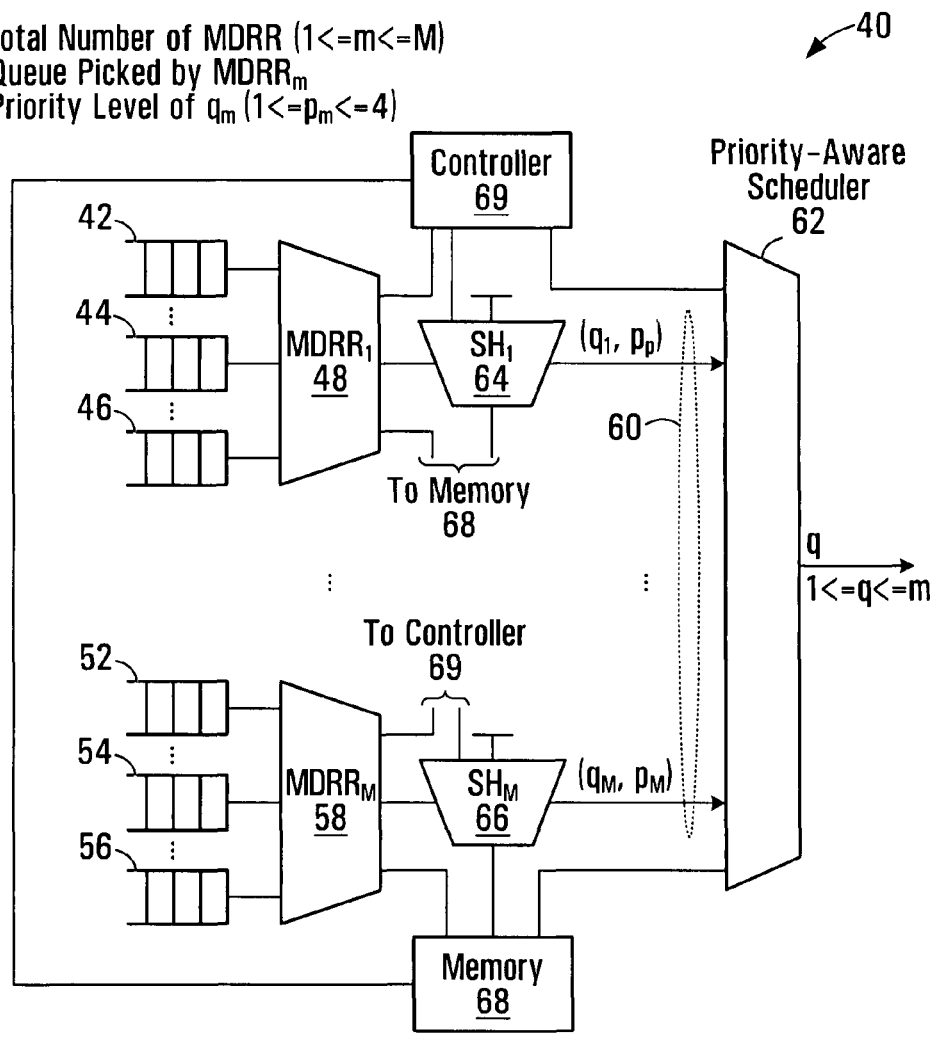
FIG. 3 is a block diagram of a hierarchical scheduler according to an embodiment of the invention.

FIG. 3 is a block diagram of a hierarchical scheduler according to an embodiment of the invention. The hierarchical scheduler 40 includes member schedulers 48, 58, which schedule communication traffic from queues 42/44/46, 52/54/56, optional shapers 64, 66 operatively coupled between the schedulers 48, 58 and the higher-level priority-aware scheduler 62, and a memory 68 and a controller 69 that are operatively coupled to each other and to all of the other scheduler components. The numeral 60 in FIG. 3 is intended to generally denote an interface that enables the priority-aware scheduler 62 to further schedule traffic that has already been scheduled by the schedulers 48, 58.

It should be appreciated that the scheduler 40 of FIG. 3 is intended solely for illustrative purposes, and that the present invention is in no way limited to the particular example embodiment explicitly shown in the drawing and described herein. For example, a hierarchical scheduler could include more than the two member schedulers 48, 58, and/or more than two levels. A hierarchical scheduler according to an embodiment of the invention could be used at any of those levels, including the member MDRR level shown in FIG. 3. Also, as noted above, the shapers 64, 66 are optional, and embodiments of the invention can be implemented without shapers, or with shapers only for some of the member schedulers 48, 58 in a hierarchical scheduler. Shapers might be provided for all lower-level schedulers, but selectively enabled for all or only certain ones of the schedulers.

The memory-based implementation shown in FIG. 3 is also intended to be illustrative. Each of the schedulers 48, 58, 62, as well as each shaper 64, 66, may maintain its own configuration and state information in registers and/or memories. In a single-memory implementation, there is one piece of physical memory that stores information an entry for each scheduler and shaper. Each component of a hierarchical scheduler may instead store its configuration and state information, and/or possibly other information, in respective separate registers or memories. A memory-based implementation might be especially appropriate when the number of schedulers is relatively high, such as greater than 32, because memories tend to have a smaller die area and be easier for physical design than many discrete registers. However, having registers or memories is simply an implementation choice, and the present invention is in no way restricted to either of these types of implementations.

More generally, other embodiments may include further, fewer, and/or different components interconnected in a similar or different manner than shown.

Those skilled in the art will appreciate that the queues 42, 44, 46, 52, 54, 56 may be implemented in any of various forms, using a variety of memory devices. Solid state memory devices are commonly used for this purpose, although other types of memory devices using movable or even removable storage media could also or instead be used. These queues store communication traffic that may be received from any of a number of types of traffic sources, including user communication devices, for example, while that traffic is waiting to be scheduled.

The memory 68 may also include one or more memory devices of any of various types. As discussed in further detail below, the memory 68 may be used to store Active lists and a Pending list that are used in some embodiments.

Software, hardware, firmware, or combinations thereof may be used to implement the schedulers 48, 58, the shapers 64, 66, the priority-aware scheduler 62, and the controller 69. Any or all of microprocessors for executing software stored on a computer-readable medium, such as in the memory 68, Application Specific Integrated Circuits (ASICs), Programmable Logic Devices (PLDs), and Field Programmable Gate Arrays (FPGAs) are examples of devices that may be suitable for implementing these components. Given such a broad range of possible implementations, these components are described below primarily in terms of their functions. Based on these functional descriptions, a person skilled in the art would be enabled to implement embodiments of the invention in any of various ways.

Considering the actual interconnections between the components shown in FIG. 3, these may, at least to some extent, be implementation-dependent. Physical connections such as traces on an electronic circuit card, other types of wired connections, and wireless connections, as well as logical connections between software components through shared memory areas or registers, represent examples of operative couplings that may be provided in embodiments of the invention.

In operation, the schedulers 48, 58 schedule communication traffic from the queues 42/44/46, 52/54/56, respectively. Each scheduler 48, 58 supports a multiple priority scheduling function to schedule communication traffic having any of a number of priorities. Although the member schedulers 48, 58 are MDRR schedulers in the example shown, other embodiments of the invention may be implemented in conjunction with other types of member schedulers instead of or in addition to MDRR schedulers.

The priority-aware scheduler 62 is operatively coupled to the plurality of schedulers, through the shapers 64, 66 in the example shown, and schedules communication traffic from the plurality of schedulers based on the priorities of communication traffic scheduled by each of the schedulers 48, 58.

In one embodiment, the priority-aware scheduler 62 schedules traffic by maintaining multiple Active lists, illustratively as lists in the memory 68. The Active lists are respectively associated with different traffic priorities. Each member scheduler 48, 58 schedules communication traffic to the Active list associated with the priority of communication traffic it is currently scheduling.

The effect of an Active list itself could potentially be implemented in a number of ways. For example, an Active list might include an identifier of each member scheduler 48, 58 that has scheduled traffic having the priority associated with that Active list. In this case, each Active list is a list of schedulers that have scheduled traffic of a certain priority. An Active list might also or instead be used to store an indication of the particular queue 42/44/46, 52/54/56 from which traffic has been scheduled by the member schedulers 48, 58, and possibly an indication of the priority of the scheduled traffic. Another option would be to store in each Active list the actual scheduled traffic, such as a packet, that the scheduler has scheduled.

The present invention is in no way limited to any particular scheme for managing Active lists, and references herein to scheduling traffic to an Active list is intended to convey all of the above options, as well as others that may be or become apparent to those skilled in the art.

It should also be noted that a member scheduler 48, 58, and the priority-aware scheduler 62 as well, need not necessarily output any traffic by themselves; they need not even hold any actual traffic or packet data. A scheduler might be considered a sort of manager that decides which queue's traffic is to either proceed to next level scheduling or be output. A scheduler itself does not need to take temporary "ownership" of the traffic it schedules, even though it may have integrated intelligence and memory to handle packet data.

According to one embodiment, the priority-aware scheduler 62 services the Active lists in priority order according to a DRR scheduling algorithm, although other algorithms could potentially be used.

In the example hierarchical scheduler 40, the shapers 64, 66 are respectively operatively coupled between the schedulers 48, 58 and the priority-aware scheduler 62. The shapers 64, 66 are effectively gatekeepers that may allow or deny scheduling of traffic by a member scheduler 48, 58 to the priority-aware scheduler 62 pass or denying it. It is not outputting any traffic. Each shaper 64, 66 controls the scheduling of traffic by its scheduler 48, 58 to the priority-aware scheduler 62. The shapers 64, 66 allow communication traffic to be scheduled to the priority-aware scheduler 62 by the member schedulers 48, 58 at up to a maximum rate, in order to provide desired traffic patterns. The rates for the shapers 64, 66 may be the same or different.

More generally, a set of shapers may include shapers that have the same rate and/or shapers that have different rates. To be clear, the same hierarchical scheduler might include some shapers that have the same rate and others that have different rates, or all of the shapers may have different rates. Any combination of common and different rates may be provided, for example, by configuring the shapers with desired shaping rates or patterns.

As noted above, the priority-aware scheduler 62 may manage priority-based scheduling using Active lists, with one Active list per traffic priority level. A Pending list may also be maintained by the priority-aware scheduler 62 to enable the shapers 64, 66 to manage their maximum rates. However, in the case of a Pending list, a single list could be maintained for all member schedulers that have a shaper.

A scheduler 48, 58 that is operatively coupled to a shaper 64, 66 can then make use of the Pending list when its shaper has reached its maximum rate. The Pending list, like the Active lists, might store scheduler identifiers, queue identifiers and possibly traffic priority indications, and/or scheduled communication traffic.

The Pending list could instead be a Pending state, with 1 bit per scheduler 48, 58 indicating whether each respective scheduler is in a Pending state waiting for shaper token updates, for example. Shaper tokens are described in further detail below.

As noted above, Active lists may be implemented as link lists with queues/schedulers as members. In one embodiment, the members are serviced in order, head-to-tail. A member might stay at the head of the list as long as it has a deficit as defined in a DRR algorithm used by the priority-aware scheduler 62. Pending list functionality could effectively be incorporated into the Active lists and a scheduler state. A member in an Active list might have a Pending state bit=0, whereas the same member will have Pending state bit=1 when it runs out of shaper tokens. Hence, in an implementation where there is no Pending list in the form of an actual list but there is Pending list functionality supported by a Pending state bit, that bit could be part of every scheduler state, with the value of the bit determining whether the scheduler is in an active or a pending state.

Another option for the Pending list would be to store entries in the form of {q,p}48, {q,p}58, where {q,p}m is a tuple identifying the winner queue (q) of scheduler m with priority p. The entry for scheduler m can be updated every time a queue q with priority p higher than {q,p}m comes in, even when the scheduler m is waiting in the Pending list. This mechanism could be used to ensure that higher priority traffic is scheduled before lower priority traffic when shaper tokens are replenished, for example.

A similar mechanism could be used to allow lower-level schedulers to move between Active lists before currently scheduled communication traffic has been scheduled from an Active list by a higher-level priority-aware scheduler. For example, if the priority p of communication traffic changes for a scheduler that is in Active list m which is not for p, the scheduler can be removed from the Active list m and added to the tail of a different Active list n assigned for priority p.

Shapers such as 64, 66 may use tokens to manage their maximum rates. Shaper tokens representing a total amount of traffic that a shaper can permit to be scheduled within a certain period of time might be refreshed periodically. A shaper 64, 66 may issue tokens to its scheduler 48, 58 to allow the scheduler to schedule blocks of traffic. For example, in some embodiments, the member schedulers 48, 58 schedule variable length packets of traffic, and the shapers 64, 66 manage tokens that each allow a certain number of bytes of traffic to be scheduled. In this case, the scheduler 48 is able to schedule a packet of traffic to an Active list when the length of the packet is less than or equal to the total number of bytes corresponding to the number of tokens it has been issued by its shaper 64. A scheduler 48, 58 that has traffic to schedule but does not have enough shaper tokens to schedule at least one packet or block of traffic is added to the Pending list.

When tokens for a shaper 64, 66 are replenished, that shaper can again allow it scheduler 48, 58 to schedule traffic to the priority-aware scheduler 62. In this case, a scheduler 48, 58 that has scheduled communication traffic to the Pending list and is issued sufficient tokens by its shaper 64, 66 is "moved" from the Pending list to the end of an Active list since it is now permitted to schedule traffic again. The Active list that is chosen is the one that corresponds to the priority of the traffic that the member scheduler 48, 58 is ready to send at the time when its shaper tokens become positive.

The mechanism by which a scheduler 48, 58 moves from the Pending list to an Active list may be implemented in any of various ways. For example, a shaper 64, 66 may issue a token to, or otherwise alert its scheduler 48, 58, when its tokens are replenished. The scheduler 48, 58 can then remove itself from the Pending list and add itself to the appropriate Active list. The shaper 64, 66 itself could potentially move its scheduler 48, 58 from the Pending list to an Active list.

In some embodiments, the controller 69 controls shaper alerts, updates, movement of schedulers in and out of the Active and Pending lists, and possibly other functions. The controller 69, although shown in FIG. 3 as a single component, can be broken down into a group of smaller and distributed controllers to control any or all of these functions in a distributed but co-ordinated fashion.

As shown near the interface 60, the priority-aware scheduler 62 may receive from the schedulers 48, 58, through the shapers 64, 66, an indication of a queue from which traffic has been scheduled, as well as the priority of the scheduled traffic. The priority-aware scheduler 62 can then further schedule the traffic based on priorities, which as noted above may dynamically change, in that the lower-level schedulers 48, 58 are not restricted to any particular traffic priority.

An output of the priority-aware scheduler 62 is similarly shown as an identifier of a queue. In other embodiments, actual scheduled traffic, in the form of packets or other traffic blocks, could be transferred between the schedulers 48, 58 and the priority-aware scheduler 62, and/or output by the priority-aware scheduler.

In schedulers with more levels of hierarchy, multiple instances of the priority-aware scheduler 62, or even an entire hierarchical scheduler 40, may feed to the next level, which can similarly include a priority-aware scheduler. In that case, the priority-aware scheduler 62, like its member schedulers 48, 58, output {q, p} for use by the next level. Hence, q is not necessarily the only output of the priority-aware scheduler 62. Traffic priority p may also be provided as an output if there is a next level of scheduling that has a priority-aware scheduler. Otherwise, if the level after the priority-aware scheduler 62 is not priority aware, the priority-aware scheduler 62 may simply output q, as shown.

Thus, as will be apparent from the foregoing, each member scheduler 48, 58 may select one of its traffic queues, and the priority-aware scheduler 62 effectively aggregates the decisions of the member schedulers. The outputs of the member schedulers are optionally shaped.

If the higher-level scheduler were a standard DRR instead of the priority-aware scheduler 62, it would select traffic from one of the member schedulers 48, 58 based on a configured quantum, without prioritizing between the member schedulers. If there are many member schedulers, say 128, a color-blind aggregating DRR can result in high jitter of high priority traffic.

On the other hand, a priority-aware scheduler 62 might use multiple priority-based Active lists instead of just one Active list as in standard DRR. A member scheduler 48, 58 in any Active list of the aggregating higher-level scheduler 62 can move to another Active list if traffic having a different priority is available in any its queues. A member scheduler 48, 58 can also move to the Pending list when it does not have any credits or tokens from the optional shaper that is shaping its output, and from the Pending list to an Active list when credits/tokens again become available.

Figure 4:
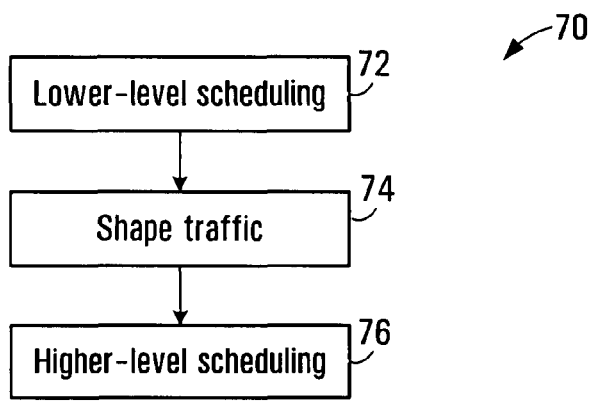
FIG. 4 is a flow diagram illustrating a method according to an embodiment of the invention.

Embodiments of the invention have been described above primarily in the context of an apparatus. FIG. 4 is a flow diagram illustrating a method according to an embodiment of the invention. The method 70 includes lower-level scheduling of communication traffic at 72. Each lower-level scheduler supports a multiple priority scheduling function to schedule communication traffic having any of a number of priorities. Traffic scheduled by the lower-level schedulers is optionally shaped at 74, and further scheduling is performed at 76 based on the priorities of the traffic scheduled by the lower-level schedulers.

The method 70 represents an illustrative embodiment of the invention. Other embodiments may include further, fewer, or different operations performed in a similar or different order. The operations shown in FIG. 4 may also be performed in various ways. For example, a Pending list and/or shaper tokens may be used in shaping traffic at 74, and Active lists may be used for higher-level scheduling and shaping in some embodiments, as described above with reference to FIG. 3.

The method 70 may be recursive in some embodiments, with the operation at 76 effectively being replaced by the operations a 72, 74, and 76. A recursive method is used where there are more levels of priority-aware scheduling. For example, with reference again to FIG. 3 for clarity, Voice, Video, Data queues of two DSL subscribers might be at the leaf level similar to 42/44/46, 52/54/56. Those queues will be managed by the subscriber level MDRR schedulers 48, 58, illustratively one per subscriber. Multiple subscriber MDRR schedulers 48, 58 may be aggregated in a concentrator placed in a neighborhood, with the concentrator level corresponding to the priority-aware scheduler 62. Several of these neighborhood concentrators (aggregators) may be aggregated again at the Central Office in a single piece of equipment, and that level corresponds to another priority-aware scheduler (not shown in FIG. 3), after the priority-aware scheduler 62. The Central Office equipment may also perform other functions such as Traffic Management for all levels, centrally, before sending the traffic downstream through the neighborhood concentrator.

Further variations may be or become apparent to those skilled in the art.

From the foregoing, it will be appreciated that embodiments of the invention provide a scheduler algorithm suitable for second or higher level schedulers. Jitter of high priority traffic can be reduced in some embodiments by using a modified version of standard DRR. Modifications may include any or all of: multiple Active lists, including one list per priority level; a new concept of a Pending list to integrate an optional shaper into the algorithm for shaping the output of a lower-level member scheduler; and a new DRR-like algorithm to move a lower-level member scheduler from the Pending list to an Active list, and from one of the Active lists to another.

The higher-level scheduling algorithm includes the following behaviours in some embodiments: a scheduler that has no traffic to schedule is in none of the lists; a scheduler that has traffic scheduled at a certain priority level (and also has sufficient shaper tokens in some embodiments) is a member of the Active list at that level; a scheduler that has traffic scheduled and its shaper enabled but does not have sufficient tokens, is in the Pending list; a scheduler moves from the Pending list to the Active list when sufficient shaper tokens become available; and a scheduler moves from one Active list to another Active list when it has traffic scheduled and sufficient shaper tokens but its scheduled traffic has changed priority.

What has been described is merely illustrative of the application of principles of embodiments of the invention. Other arrangements and methods can be implemented by those skilled in the art without departing from the scope of the present invention.

For example, embodiments of the invention may be applied to any of various technologies, including but in no way limited to Gigabit-capable Passive Optical Network (GPON) products, WiMax Base Stations, WiFi Local Area Network (LAN) controllers, Ethernet switches and routers, etc.

In addition, although described primarily in the context of methods and systems, other implementations of the invention are also contemplated, as instructions stored on a computer-readable medium for instance.

I claim:

1. An apparatus comprising:
a plurality of schedulers that schedule communication traffic, each scheduler supporting a multiple priority scheduling function to schedule communication traffic having any of a plurality of priorities; and
a priority-aware scheduler, operatively coupled to the plurality of schedulers, that further schedules communication traffic from the plurality of schedulers based on priorities of communication traffic scheduled by each of the plurality of schedulers,
the priority-aware scheduler maintaining a plurality of Active lists, respectively associated with the plurality of priorities, to which the plurality of schedulers schedule communication traffic, the priority-aware scheduler further scheduling communication traffic from the Active lists by servicing the plurality of Active lists in priority order and according to a scheduling algorithm,
each scheduler of the plurality of schedulers scheduling communication traffic having different priorities to different Active lists of the plurality of Active lists, each scheduler dynamically moving between Active lists of the plurality of Active lists where priorities of communication traffic being scheduled by the scheduler change,
the apparatus further comprising:
a shaper, operatively coupled between a scheduler of the plurality of schedulers and the priority-aware scheduler, that controls scheduling of communication traffic by the scheduler to which the shaper is operatively coupled,
wherein the shaper allows the scheduler to which it is operatively coupled to schedule communication traffic at up to a maximum rate, and wherein the scheduler is added to a Pending list after the shaper has reached its maximum rate,
wherein the shaper comprises one of a plurality of shapers operatively coupled between respective schedulers of the plurality of schedulers and the priority-aware scheduler, each shaper controlling scheduling of communication traffic by the scheduler to which the shaper is operatively coupled,
wherein each shaper allows the scheduler to which it is operatively coupled to schedule communication traffic at up to a respective maximum rate, and
wherein each scheduler that is operatively coupled to a shaper is added to a Pending list after its shaper has reached its maximum rate.

2. The apparatus of claim 1, wherein the priority-aware scheduler services the plurality of Active lists in priority order according to a Deficit Round Robin (DRR) scheduling algorithm.

3. The apparatus of claim 1, wherein each shaper manages its respective maximum rate by issuing tokens to the scheduler to which it is operatively coupled, and wherein the scheduler schedules communication traffic to an Active list of the plurality of Active lists when it has communication traffic to schedule and it has sufficient shaper tokens to schedule the communication traffic, and wherein the scheduler is added to the Pending list when it has communication traffic to schedule but it does not have sufficient shaper tokens to schedule the communication traffic.

4. The apparatus of claim 3, wherein a scheduler that is operatively coupled to a shaper moves from the Pending list to an Active list when it has communication traffic to schedule and it is issued sufficient tokens to schedule the communication traffic by its shaper.

5. The apparatus of claim 1, wherein the plurality of shapers comprises shapers having different respective maximum rates.

6. A method comprising:
scheduling communication traffic in a plurality of schedulers, each scheduler supporting a multiple priority scheduling function to schedule communication traffic having any of a plurality of priorities; and
further scheduling the communication traffic scheduled in the plurality of schedulers based on priorities of communication traffic scheduled by each of the plurality of schedulers,
the further scheduling comprising maintaining a plurality of Active lists, respectively associated with the plurality of priorities, to which the plurality of schedulers schedule communication traffic, and scheduling communication traffic from the Active lists by servicing the plurality of Active lists in priority order and according to a scheduling algorithm,
the scheduling in the plurality of schedulers comprising each scheduler scheduling communication traffic having different priorities to different Active lists of the plurality of Active lists, each scheduler dynamically moving between Active lists of the plurality of Active lists where priorities of communication traffic being scheduled by the scheduler change,
the method further comprising:
shaping the communication traffic that is scheduled by a scheduler of the plurality of schedulers prior to the further scheduling by allowing the scheduler to schedule communication traffic at up to a maximum rate, and maintaining a Pending list to which the scheduler is added after the maximum rate is reached,
wherein the shaping comprises shaping the communication traffic that is scheduled by respective schedulers of the plurality of schedulers prior to the further scheduling by:
allowing communication traffic to be scheduled by the respective schedulers at up to a respective maximum rate; and
maintaining a Pending list to which each scheduler of the respective schedulers is added after the respective maximum rate of the shaping is reached.

7. The method of claim 6, wherein the further scheduling comprises servicing the plurality of Active lists in priority order according to a Deficit Round Robin (DRR) scheduling algorithm.

8. The method of claim 6,
wherein the allowing comprises managing the respective maximum rate by issuing tokens to the scheduler,
wherein the scheduling by each scheduler comprises scheduling communication traffic to an Active list of the plurality of Active lists when it has communication traffic to schedule and it has sufficient shaper tokens to schedule the communication traffic, and
wherein the scheduler is added to the Pending list when it has communication traffic to schedule but it does not have sufficient shaper tokens to schedule the communication traffic.

9. The method of claim 8, wherein the scheduling comprises moving a scheduler from the Pending list to an Active list of the plurality of Active lists when it has communication traffic to schedule and it is issued sufficient shaper tokens to schedule the communication traffic.

10. The method of claim 6, wherein the allowing comprises allowing communication traffic to be scheduled by the respective schedulers at up to different respective maximum rates.

11. An apparatus comprising:
a plurality of means for scheduling communication traffic, wherein each of the means for scheduling supports a multiple priority scheduling function to schedule communication traffic having any of a plurality of priorities; and
means for further scheduling the communication traffic scheduled in the plurality of means for scheduling based on priorities of communication traffic scheduled by each of the plurality of means for scheduling,
wherein the means for further scheduling maintains a plurality of Active lists, respectively associated with the plurality of priorities, to which the plurality of means for scheduling schedule communication traffic, and schedules communication traffic from the Active lists by servicing the plurality of Active lists in priority order and according to a scheduling algorithm,
wherein each means for scheduling schedules communication traffic having different priorities to different Active lists of the plurality of Active lists, and dynamically moves between Active lists of the plurality of Active lists where priorities of communication traffic being scheduled by the means for scheduling change,
the apparatus further comprising:
means for shaping the communication traffic that is scheduled by a means for scheduling of the plurality of means for scheduling prior to the further scheduling by the means for further scheduling, wherein the means for shaping allows the means for scheduling to schedule communication traffic at up to a maximum rate, and maintains a Pending list to which the means for scheduling is added after the maximum rate is reached,
wherein the means for shaping shapes the communication traffic that is scheduled by respective means for scheduling of the plurality of means for scheduling prior to the further scheduling by the means for further scheduling, and comprises:
means for allowing communication traffic to be scheduled by the respective means for scheduling at up to a respective maximum rate; and
means for maintaining a Pending list to which each means for scheduling of the respective means for scheduling is added after the respective maximum rate of the shaping is reached.

* * * * *